United States Patent
Aratani et al.

(10) Patent No.: US 11,440,125 B2
(45) Date of Patent: Sep. 13, 2022

(54) ELECTRIC RESISTANCE WELDED STEEL PIPE FOR PRODUCING HOLLOW STABILIZER, HOLLOW STABILIZER, AND PRODUCTION METHODS FOR SAME

(71) Applicant: JFE Steel Corporation, Tokyo (JP)

(72) Inventors: Masatoshi Aratani, Tokyo (JP); Ryoji Matsui, Tokyo (JP); Hiroshi Nakata, Tokyo (JP); Tomonori Kondo, Tokyo (JP); Hiromichi Hori, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 87 days.

(21) Appl. No.: 16/979,357

(22) PCT Filed: Mar. 11, 2019

(86) PCT No.: PCT/JP2019/009811
§ 371 (c)(1),
(2) Date: Sep. 9, 2020

(87) PCT Pub. No.: WO2019/188224
PCT Pub. Date: Oct. 3, 2019

(65) Prior Publication Data
US 2021/0001425 A1    Jan. 7, 2021

(30) Foreign Application Priority Data
Mar. 29, 2018  (JP) .............................. JP2018-065875

(51) Int. Cl.
*B23K 11/093* (2006.01)
*B21B 17/14* (2006.01)
(Continued)

(52) U.S. Cl.
CPC .......... *B23K 11/0935* (2013.01); *B21B 17/14* (2013.01); *B21C 37/08* (2013.01);
(Continued)

(58) Field of Classification Search
CPC ......... B21B 17/14; B21C 37/08; B21C 37/30; B21D 5/10; B21D 5/12; B21D 53/88;
(Continued)

(56) References Cited

U.S. PATENT DOCUMENTS 9,862,014 B2    1/2018  Kawabata et al.
2008/0105731 A1*  5/2008  Kodama ................ G01B 11/24
356/601

(Continued)

FOREIGN PATENT DOCUMENTS

JP      H06238488 A  *  8/1994
JP      2005076047 A      3/2005
(Continued)

OTHER PUBLICATIONS

International Search Report and Written Opinion for International Application No. PCT/JP2019/009811, dated May 21, 2019, 7 pages.
(Continued)

*Primary Examiner* — Jenny R Wu
(74) *Attorney, Agent, or Firm* — RatnerPrestia

(57) ABSTRACT

There are provided an electric resistance welded steel pipe for producing a high strength hollow stabilizer excellent in fatigue resistance and a high strength hollow stabilizer. In an electric resistance welded steel pipe (5) for producing a hollow stabilizer, an internal weld bead cut portion (30) has a three-peak shape and a depth (H) of a trough portion (30*a*) of the three-peak shape is 0.3 mm or less and an angle (θ) formed by a central portion in the circumferential direction of the trough portion (30*a*) and the top of right and left peak portions (30*b*, 30*c*) located on both the right and left sides of the trough portion (30*a*) is 160° or more and less than 180°.

12 Claims, 3 Drawing Sheets

(51) Int. Cl.
*B21C 37/08* (2006.01)
*B21D 5/10* (2006.01)
*B60G 21/055* (2006.01)
*C21D 6/00* (2006.01)
*C21D 8/10* (2006.01)
*C21D 9/08* (2006.01)
*C22C 38/00* (2006.01)
*C22C 38/02* (2006.01)
*C22C 38/04* (2006.01)
*C22C 38/06* (2006.01)
*C22C 38/22* (2006.01)
*C22C 38/24* (2006.01)
*C22C 38/26* (2006.01)
*C22C 38/42* (2006.01)
*C22C 38/50* (2006.01)
*C22C 38/54* (2006.01)
*C21D 9/50* (2006.01)

(52) U.S. Cl.
CPC ............. *B21D 5/10* (2013.01); *B60G 21/055* (2013.01); *C21D 6/004* (2013.01); *C21D 6/005* (2013.01); *C21D 6/008* (2013.01); *C21D 8/105* (2013.01); *C21D 9/08* (2013.01); *C21D 9/085* (2013.01); *C21D 9/50* (2013.01); *C22C 38/002* (2013.01); *C22C 38/005* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/42* (2013.01); *C22C 38/50* (2013.01); *C22C 38/54* (2013.01); *B60G 2206/012* (2013.01); *B60G 2206/724* (2013.01); *B60G 2206/81035* (2013.01); *B60G 2206/81062* (2013.01)

(58) Field of Classification Search
CPC ............. B60G 21/055; B60G 2206/012; B60G 2206/427; B60G 2206/724; B60G 2206/81035; B60G 2206/81062; B23K 11/0935; B23K 13/00; B23K 2101/06; B23K 2103/04; B23K 37/08; C21D 6/008; C21D 8/10; C21D 8/105; C21D 9/08; C21D 9/085; C21D 9/50; C21D 6/004; C21D 6/005; C22C 38/00; C22C 38/002; C22C 38/005; C22C 38/02; C22C 38/04; C22C 38/06; C22C 38/22; C22C 38/24; C22C 38/26; C22C 38/38; C22C 38/42; C22C 38/50; C22C 38/54; C22C 38/58

See application file for complete search history.

(56) References Cited

U.S. PATENT DOCUMENTS

| | | | |
|---|---|---|---|
| 2011/0023990 A1 | 2/2011 | Yano et al. | |
| 2015/0090370 A1* | 4/2015 | Shimamura | C22C 38/02 148/333 |
| 2015/0176101 A1 | 6/2015 | Ishisuka et al. | |

FOREIGN PATENT DOCUMENTS

| | | | | |
|---|---|---|---|---|
| JP | 2007270349 A | | 10/2007 | |
| JP | 2008208417 A | * | 9/2008 | ............. B21C 37/08 |
| JP | 2008208417 A | | 9/2008 | |
| WO | 2009123330 A1 | | 10/2009 | |
| WO | 2013175821 A1 | | 11/2013 | |

OTHER PUBLICATIONS

International Preliminary Report on Patentability and Written Opinion for International Application No. PCT/JP2019/009811, dated Sep. 29, 2020, 6 pages.

\* cited by examiner

ELECTRIC RESISTANCE WELDED STEEL PIPE FOR PRODUCING HOLLOW STABILIZER, HOLLOW STABILIZER, AND PRODUCTION METHODS FOR SAME

CROSS REFERENCE TO RELATED APPLICATIONS

This is the U.S. National Phase application of PCT/JP2019/009811, filed Mar. 11, 2019 which claims priority to Japanese Patent Application No. 2018-065875, filed Mar. 29, 2018, the disclosures of these applications being incorporated herein by reference in their entireties for all purposes.

FIELD OF THE INVENTION

The present invention is a technology relating to a hollow stabilizer.

Herein, in this specification, the Vickers hardness is expressed by average hardness in the thickness direction. "High strength" indicates a case where the strength is 400 HV or more and preferably 450 HV or more in terms of the Vickers hardness.

BACKGROUND OF THE INVENTION

In usual, an automobile has a stabilizer in order to reduce the rolling of an automobile body in cornering or to keep the traveling stability in high speed traveling. Recently, it is common to use a hollow stabilizer containing a steel pipe as the stabilizer in order to reduce the weight of the automobile body.

Such a hollow stabilizer commonly contains a seamless steel pipe or an electric resistance welded steel pipe produced by electric resistance welding as a raw material. Such a steel pipe is molded into a target stabilizer shape by cold rolling, and then subjected to thermal refining treatment, such as quenching or quenching and tempering, to be made into a product. In particular, the electric resistance welded steel pipe is relatively inexpensive and excellent in dimensional accuracy, and therefore has been widely used as a raw material for producing the hollow stabilizer.

As the inventions of conventional hollow stabilizers, the inventions described in PTLS 1 and 2 are mentioned, for example.

More specifically, PTL 1 describes a production method for a hollow stabilizer excellent in fatigue resistance.

According to PTL 1, a welded steel pipe having a composition containing, in terms of % by mass, C: 0.2 to 0.38%, Si: 0.35% or less, Mn: 0.3 to 1.5%, Al: 0.1% or less, Ti: 0.005 to 0.1%, and B: 0.0005 to 0.005% is used as a raw material and the raw material is subjected to heat treatment including heating the raw material to a temperature in the range of 800 to 1000° C., and then subjected to reduction rolling with a cumulative reduction ratio: 40% or more at a rolling temperature: 600 to 850° C. to be made into a steel pipe for producing a hollow stabilizer. Thereafter, according to PTL 1, the steel pipe is sequentially subjected to a molding step of molding the steel pipe into a stabilizer shape by cold bending and a heat treatment step of applying quenching treatment and tempering treatment to the steel pipe to form a hollow stabilizer. PTL 1 describes that the production method can improve the fatigue resistance by an inexpensive method.

According to PTL 2, a steel sheet having a composition containing, in terms of % by mass, C: 0.15 to 0.40%, Si: 0.05 to 0.50%, Mn: 0.30 to 2.00%, Al: 0.01 to 0.10%, Ti: 0.001 to 0.04%, B: 0.0005 to 0.0050%, and N: 0.0010 to 0.0100% and containing Ti, N to satisfy (N/14)<(Ti/47.9) is made into a substantially cylindrical-shaped open pipe, end portions of the open pipe are butted against each other, and then electric resistance welding is performed to the end portions while adjusting heat input such that the bond width is 30 to 65 μm by high frequency resistance welding to form an electric resistance welded pipe. Then, according to PTL 2, the electric resistance welded pipe is heated to a temperature equal to or higher than a $Ac_3$ transformation point, and then subjected to stretch reducing with a draft equal to or higher than (1-25/Bond width before stretch reducing (μm)×100% in terms of an outer diameter ratio, so that the bond width is set to 25 or less. PTL 2 describes producing an electric resistance welded steel pipe for heat treatment excellent in flatness by the treatment above. PTL 2 describes that the produced electric resistance welded steel pipe is suitable for the use of being subjected to quenching treatment, e.g., a hollow stabilizer, and that the reduced-carbon layer width of an electric resistance weld zone is narrow, and therefore, even when quenching treatment by rapid and short-time heating is applied thereto, a reduction in the quenching hardness of the electric resistance weld zone can be suppressed, so that a hollow stabilizer excellent in durability can be obtained.

PATENT LITERATURE

PTL 1: JP 2005-076047 A
PTL 2: JP 2008-208417 A

SUMMARY OF THE INVENTION

When hot reducing work is applied to a steel pipe as in the technologies described in PTLS 1 and 2, irregularities accompanying pipe inner surface reducing are generated in the steel pipe. Particularly in the electric resistance weld zone, bead cutting treatment is applied to an internal weld zone in a base pipe stage before the hot reducing work so that an internal weld bead cut portion is formed. The weld bead cut shape in the base pipe stage is affected by a difference between the hardness of a weld bond zone and the hardness of a peripheral portion thereof. Therefore, the shape of the internal weld bead cut portion is deformed into a complicated three-peak shape by the hot reducing work. Then, the present inventors have conducted an examination to obtain a finding that a portion having the three-peak shape of the internal weld bead cut portion serves as a stress concentration portion when a torsional stress is given to a stabilizer to cause a reduction in the fatigue characteristics depending on the situation. The reduction in the fatigue characteristics due to the stress concentration becomes remarkable particularly in the case of a high strength stabilizer.

Furthermore, with an increase in the strength of the stabilizer and with a reduction in the pipe thickness, a stress on the pipe outer surface side and a stress on the pipe inner surface side become closer to each other with respect to the stress generated when the stabilizer is twisted. Therefore, the stabilizer is likely to be affected by the surface properties or the surface shape of the pipe inner surface side, which increases the probability of the occurrence of a crack with the pipe inner surface side as the starting point. The occurrence of a crack is a major issue of a pipe produced by the hot reducing work. Cold drawing (cold drawing work) smoothes the inner surface shape but involves an increase in the production cost.

Aspects of the present invention have been made focusing on the above-described points. It is an object according to aspects of the present invention to provide an electric resistance welded steel pipe for producing a hollow stabilizer excellent in fatigue resistance and having high strength and a hollow stabilizer excellent in fatigue resistance and having high strength.

The present inventors have examined the influence of the shape of an internal weld bead zone on the fatigue characteristics of a high strength hollow stabilizer. As a result, the present inventors have obtained a finding that it is important, with respect to the fatigue, to control a depth H of a thin portion (trough portion) of a three-peak shape and an angle θ formed by the thin portion (trough portion) and right and left peak portions containing central thick portions of the three-peak shape in the internal weld bead zone within a specific range.

Aspects of the present invention have been accomplished by further adding an examination based on the finding.

In order to solve the problems, in an electric resistance welded steel pipe for producing a hollow stabilizer of one aspect of the present invention, an internal weld bead cut portion has a three-peak shape, a depth H of a trough portion of the three-peak shape is 0.3 mm or less, and an angle θ formed by a central portion in the circumferential direction of the trough portion and the top of right and left peak portions located on both the right and left sides of the trough portion is 160° or more and less than 180°.

One aspect of the present invention is a hollow stabilizer containing the electric resistance welded steel pipe for producing a hollow stabilizer of one aspect described above and having Vickers hardness of 400 HV or more and less than 580 HV.

A production method for a hollow stabilizer of one aspect of the present invention includes applying cold bending to the electric resistance welded steel pipe for producing a hollow stabilizer of one aspect described above, and then applying heat treatment including quenching treatment or quenching and tempering treatment thereto so that the hardness after the heat treatment is set to 400 HV or more and less than 580 HV in terms of the Vickers hardness.

A production method for an electric resistance welded steel pipe for producing a hollow stabilizer of one aspect of the present invention includes a first step of molding a steel sheet into a cylindrical shape by cold molding to form an open pipe, butting end portions in the width direction of the open pipe against each other, and performing electric resistance welding to the end portions to form an electric resistance welded pipe, a second step of heating the electric resistance welded pipe to a temperature of 850° C. or more and 1000° C. or less, and then applying hot stretch reducing thereto at a rolling temperature: 650° C. or more and 1000° C. or less and at a cumulative reduction ratio: 30% or more and 90% or less, and a third step of adjusting an internal weld bead cut portion having an outline shape of a three-peak shape along the circumferential direction in which a trough portion with a reduced thickness is formed on each of both the right and left sides across a weld zone such that a depth H of the trough portion is 0.3 mm or less and an angle θ formed by a central portion in the circumferential direction of the trough portion and the top of right and left peak portions located on both the right and left sides of the trough portion is 160° or more and less than 180°.

Aspects of the present invention can provide an electric resistance welded steel pipe suitable for the production of a hollow stabilizer excellent in fatigue resistance. In particular, the electric resistance welded steel pipe is suitable for a high strength hollow stabilizer excellent in fatigue resistance.

For example, aspects of the present invention can simply produce a high strength hollow stabilizer having hardness of 400 HV or more and holding excellent corrosion fatigue resistance, and thus can exhibit remarkable industrial effects. Moreover, aspects of the present invention can also exhibit an effect that, even when the hardness is further increased, e.g., hardness of 450 HV or more, a reduction in fatigue characteristics is not observed and a contribution to a further thickness reduction of a stabilizer can be made, for example.

DETAILED DESCRIPTION OF EMBODIMENTS OF THE INVENTION

An embodiment of the present invention will now be described with reference to the drawings.

Herein, the drawings are schematic and the relationship between the thickness and the plane dimension, the distance between components, and the like are different from the actual relationship, distance, and the like. An embodiment described below describes the configuration for specifying the technological idea according to aspects of the present invention as an example. The technological idea according to aspects of the present invention does not limit the shape, structure, and the like of constituent components to the following shape, structure, and the like. The technological idea according to aspects of the present invention can be variously altered in the technological scope specified by Claims described in Claims.

This embodiment relates to an electric resistance welded steel pipe having an internal weld bead cut portion having an outline shape of a three-peak shape suitable as a steel pipe to be worked into a hollow stabilizer for use in an automobile and other vehicles and a hollow stabilizer produced from the electric resistance welded steel pipe. In particular, this embodiment is a technology suitable for producing an electric resistance welded steel pipe capable of producing a hollow stabilizer having high strength and improved fatigue characteristics or a high strength hollow stabilizer.

This embodiment is a technology particularly suitable for a case where (Thickness/Outer diameter) as the dimension of the high strength hollow stabilizer is 20% or less.

<Production Method for Electric Resistance Welded Steel Pipe 5 for Producing Hollow Stabilizer>

Figure 1:
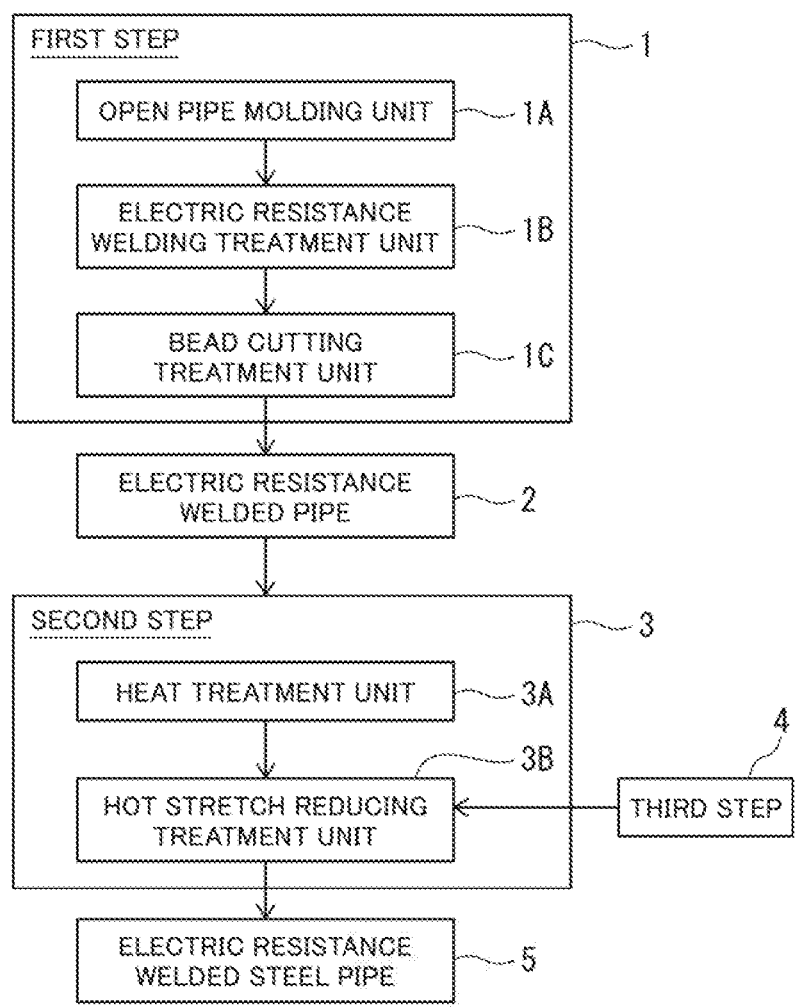
FIG. 1 is a block diagram explaining a production method for an electric resistance welded steel pipe for producing a hollow stabilizer according to an embodiment based on the present invention.

A production method for an electric resistance welded steel pipe 5 for producing a hollow stabilizer of this embodiment has a first step 1 and a second step 3 as illustrated in FIG. 1.

(First Step 1)

Figure 2:
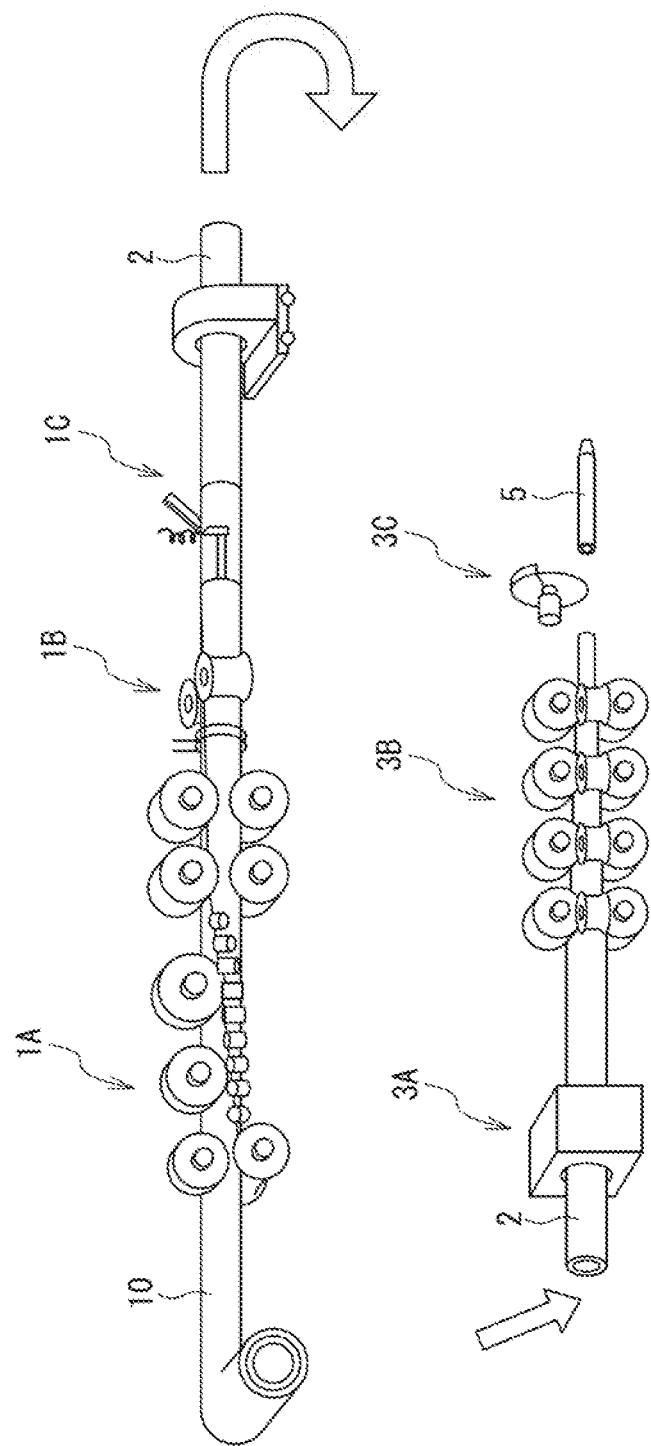
FIG. 2 is a conceptual diagram explaining the production method for an electric resistance welded steel pipe for producing a hollow stabilizer according to the embodiment based on the present invention.

The first step 1 includes producing an open pipe molding unit 1A of molding a steel sheet into a substantially cylindrical shape (tubular shape) by cold molding to form an open pipe, and producing an electric resistance welding treatment unit 1B of butting end portions in the width direction of the open pipe against each other, and performing electric resistance welding to the end portions to form an electric resistance welded pipe 2 as illustrated in FIGS. 1 and 2.

As illustrated in FIG. 2, the open pipe molding unit 1A performs treatment of continuously performing cold molding with a plurality of rolls to form the open pipe of the substantially cylindrical shape, for example.

The electric resistance welding treatment unit 1B performs treatment of butting the end portions in the width direction of the open pipe against each other with a squeeze roll, and performing electric resistance welding to the end portions by high frequency resistance welding, induction heating, and the like to form the electric resistance welded pipe 2 (electric resistance welded steel pipe) of a predetermined dimension, for example.

As the steel sheet to be used, FIG. 2 illustrates a case where the steel sheet is in a state of a steel strip. The steel sheet is preferably a hot-rolled steel sheet produced by hot-rolling.

The first step 1 further includes producing a bead cutting treatment unit 1C of cutting a weld bead generated on each of the pipe outer surface side and the pipe inner surface side by electric resistance welding as post-treatment of the electric resistance welding treatment unit 1B. The bead cutting treatment unit 1C performs treatment of continuously cutting weld beads 11 illustrated in FIG. 3 by a cutting tool. This cutting forms an internal weld bead cut portion with an outline having a circular arc-shaped cross section.

Figure 3:
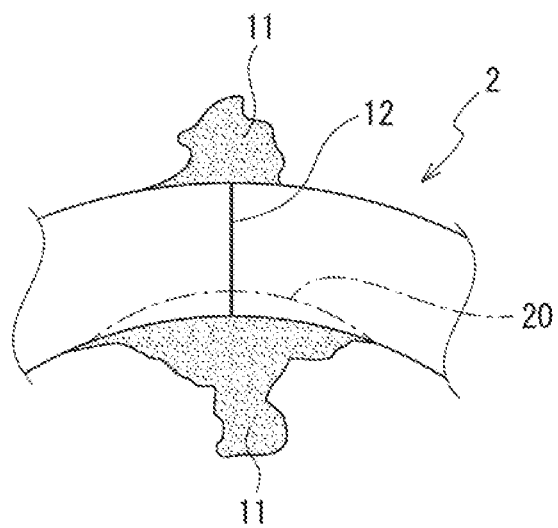
FIG. 3 is a figure explaining the shape of an internal bead cut portion in an electric resistance welded pipe produced in a first step.

More specifically, the treatment of the bead cutting treatment unit 1C forms the internal weld bead cut portion as indicated by an alternate long and short dashed line 20 in FIG. 3 on the pipe inner surface. In this state, the shape of the internal weld bead cut portion has one trough shape in which a weld zone is cut into the circular arc-shaped cross section with a weld line 12 as a central portion (see the alternate long and short dashed line 20 of FIG. 3).

(Second Step 3)

The second step 3 includes producing a heat treatment unit 3A of heating the electric resistance welded pipe 2 produced in the first step 1, and producing a hot stretch reducing treatment unit 3B of applying hot stretch reducing to the heated electric resistance welded pipe 2 to form the electric resistance welded steel pipe 5 as illustrated in FIGS. 1 and 2. A reference numeral 3C designates warm cutting treatment.

The heat treatment unit 3A performs treatment of heating the electric resistance welded pipe 2. The heating temperature is preferably set to 850° C. or more and 1000° C. or less. When the heating temperature is less than 850° C., desired weld zone toughness cannot be secured in some cases. On the other hand, at a high temperature exceeding 1000° C., surface decarburization becomes remarkable, so that the surface properties decrease in some cases.

The hot stretch reducing treatment unit 3B performs treatment of applying hot stretch reducing. The conditions of the hot stretch reducing are preferably the rolling temperature: 650° C. or more and 1000° C. or less and the cumulative reduction ratio: 30% or more and 90% or less. The cumulative reduction ratio: 30% or more and 80% or less is more preferable.

Herein, when the rolling temperature in the hot stretch reducing is less than 650° C., the workability decreases, which makes the molding into a desired stabilizer shape difficult in some cases.

The cumulative reduction ratio is a reduction ratio generated before and after the hot stretch reducing treatment.

Figure 4:
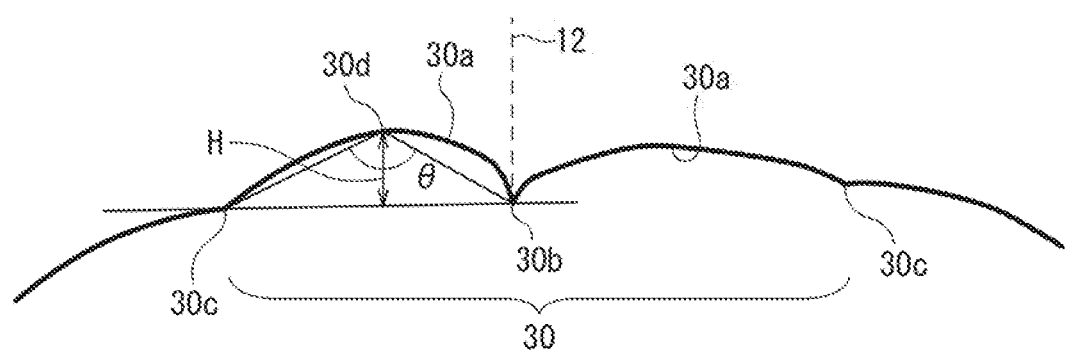
FIG. 4 is a figure illustrating the shape, a depth H of a trough portion, and an angle θ of the internal bead cut portion having a three-peak shape generated by treatment by a hot reducing treatment unit.

When the hot stretch reducing is applied, the thickness of a weld bond zone located in a central portion of the trough shape increases and the thickness of both the right and left sides of the trough shape also increases due to a difference between the hardness of the weld bond zone and the hardness of a peripheral portion thereof. Thus, one trough shape is divided into two trough portions 30a and three peaks due to the thickness increase are formed in an internal weld bead cut portion 30 as illustrated in FIG. 4. As a result, the shape of the internal weld bead cut portion 30 is changed into a three-peak shape.

This embodiment has a third step 4 of leveling the three-peak shape of the internal weld bead cut portion 30. In this embodiment, the third step 4 is carried out in synchronization with the hot stretch reducing treatment unit 3B of the second step 3.

The third step 4 is a step of adjusting the internal weld bead cut portion 30 having an outline shape of the three-peak shape along the circumferential direction in which the trough portion 30a with a reduced thickness is formed on each of both the right and left sides across the weld line 12 such that a depth H of the trough portion 30a is 0.3 mm or less and an angle θ formed by a central portion in the circumferential direction of the trough portion 30a and the top of right and left peak portions located on both the right and left sides of the trough portion 30a is 160° or more and less than 180° after the hot stretch reducing. The central portion in the circumferential direction of the trough portion 30a serves as the substantially deepest position.

The third step 4 is performed by adjustment treatment of forming the steel pipe 5 into a thinner gauged steel sheet, for example. For example, the third step 4 is treatment of forming a steel pipe into a thinner gauged steel sheet such that a thickness reduction ratio is 0% or more and 10% or less and preferably 3% or more and 10% or less before and after the stretch reducing. The thickness reduction ratio is specified by (Thickness before reducing−Thickness after reducing)/Thickness before reducing×100(%).

Herein, by properly adjusting the cumulative reduction ratio and the thickness reduction ratio within the range where the cumulative reduction ratio is 30% or more and 90% or less and the thickness reduction ratio before and after the stretch reducing is 0% or more and 10% or less, the shape of the internal weld bead cut portion 30 satisfying the depth H range and the angle θ range above can be molded.

More specifically, the adjustment of the thickness reduction ratio before and after stretch reducing rolling in accordance with the cumulative reduction ratio in the hot stretch reducing enables the adjustment such that the depth H of the trough portion 30a is 0.3 mm or less and the angle θ formed by the central portion in the circumferential direction of the trough portion 30a and the top of the right and left peak portions located on both the right and left sides of the trough portion 30a is 160° or more and less than 180°.

The depth of the trough portion 30a is a depth with respect to the straight line connecting the peak portions 30b, 30c on both the right and left sides as illustrated in FIG. 4.

Herein, when the cumulative reduction ratio is less than 30%, the cumulative reduction ratio is not suitable for the size as a steel pipe for producing a stabilizer. When the cumulative reduction ratio exceeds 90%, irregularities of a raw material of the pipe inner surface increase even when the stretch in the longitudinal direction of the pipe is increased, and therefore a desired internal weld bead shape is not obtained.

When the thickness reduction ratio is less than 0%, i.e., when the thickness is increased, irregularities of the raw material of the pipe inner surface increase, which makes it difficult to improve the internal weld bead shape. On the other hand, when the thickness reduction ratio exceeds 10%, the stretching force becomes excessive, and thus a fracture occurs in the hot stretch reducing or a thin portion of the pipe internal weld bead zone becomes remarkable, which leads to a reduction in the fatigue characteristics.

<Configuration of Electric Resistance Welded Steel Pipe 5 for Producing Hollow Stabilizer>

The electric resistance welded steel pipe 5 for producing a hollow stabilizer of this embodiment is produced by the production method described above, for example.

The electric resistance welded steel pipe 5 for producing a hollow stabilizer of this embodiment is the electric resistance welded steel pipe 5 which is a steel pipe for producing a hollow stabilizer and has the internal weld bead cut portion 30 having the outline shape of the three-peak shape along the circumferential direction in which the trough portion 30a with a reduced thickness is formed on each of both the right and left sides across the weld zone on the pipe inner surface. In the internal weld bead cut portion 30, the depth H of the trough portion 30a is 0.3 mm or less and the angle θ formed by the central portion in the circumferential direction of the trough portion 30a and the top of right and left peak portions 30b, 30c located on both the right and left sides of the trough portion 30a is 160° or more and less than 180°.

Steel materials configuring the electric resistance welded steel pipe 5 are steel materials having Vickers hardness of 400 HV or more and preferably 450 HV or more. In order to obtain a hollow stabilizer having Vickers hardness of 450 HV or more, steel materials preferably contain, in terms of % by mass, C: 0.20% or more and 0.40% or less, Si: 0.1% or more and 1.0% or less, Mn: 0.1% or more and 2.0% or less, P: 0.100% or less, S: 0.010% or less, Al: 0.01% or more and 0.10% or less, Cr: 0.01% or more and 0.50% or less, Ti: 0.01% or more and 0.05% or less, B: 0.0005% or more and 0.0050% or less, Ca: 0.0001% or more and 0.0050% or less, N: 0.0050% or less, and the balance of Fe and inevitable impurities.

It is preferable for the steel materials configuring the electric resistance welded steel pipe 5 to further contain, in terms of % by mass, either or both of Cu: 0.05% or more and 1.00% or less and Ni: 0.05% or more and 1.00% or less.

It is preferable for the steel materials configuring the electric resistance welded steel pipe 5 to further contain, in terms of % by mass, one or two or more kinds selected from Nb: 0.001% or more and 0.005% or less, W: 0.001% or more and 0.050% or less, and V: 0.05% or more and 0.50% or less.

It is preferable for the steel materials configuring the steel pipe to further contain, in terms of % by mass, REM: 0.001% or more and 0.020% or less.

(Reasons for Limiting Composition)

Next, reasons for limiting the composition of the electric resistance welded steel pipe 5 are described. Hereinafter, % by mass is simply expressed by "%" unless otherwise particularly specified.

C: 0.20% or more and 0.40% or less

C is an element having actions of promoting the generation of martensite through an improvement of hardenability and increasing the strength (hardness) of steel by forming a solid solution and important for increasing the strength of a hollow stabilizer. In this embodiment, in order to set the hardness after quenching and tempering treatment to 400 HV or more in terms of the Vickers hardness, the content needs to be 0.20% or more.

On the other hand, when a large amount of C is contained so that the content exceeds 0.40%, the toughness after the quenching treatment decreases. Therefore, C was limited to the range of 0.20% or more and 0.40% or less. C is preferably 0.22% or more. C is preferably 0.39% or less.

Si: 0.1% or more and 1.0% or less

Si acts as a deoxidant and also acts as a solid solution strengthening element. In order to obtain such effects, the Si content needs to be 0.1% or more. On the other hand, when the Si content exceeds 1.0%, the electric resistance weldability decreases. Therefore, Si was limited to the range of 0.1% or more and 1.0% or less. Si is preferably 0.5% or less.

Mn: 0.1% or more and 2.0% or less

Mn is an element forming a solid solution to contribute to an increase in the strength of steel and improving the hardenability of steel. In this embodiment, the Mn content needs to be 0.1% or more in order to secure desired high strength (high hardness). On the other hand, when the Mn content exceeds 2.0%, the toughness decreases and a risk of a quenching crack increases. Therefore, Mn was limited to the range of 0.1% or more and 2.0% or less. Mn is preferably 0.5% or more. Mn is preferably 1.8% or less.

P: 0.100% or less

P is an element present as an impurity and segregated in the grain boundary or the like to adversely affect weld crack properties and toughness. Thus, it is necessary to decrease P to 0.100% or less as a substance for hollow stabilizers. P is preferably 0.050% or less. Since P is inevitably contained, the P content usually reaches 0.001% or more.

S: 0.010% or less

S is an element present as a sulfide-based inclusion in steel and reducing the hot workability, toughness, and fatigue resistance. Thus, it is necessary to decrease S to 0.010% or less as a substance for hollow stabilizers. S is preferably 0.005% or less. Since S is inevitably contained, the S content usually reaches 0.001% or more.

Al: 0.01% or more and 0.10% or less

Al acts as a deoxidant and is bonded to N to exhibit an effect of securing the amount of solid solution B effective for an improvement of hardenability. Moreover, Al is precipitated as AlN and has an action of preventing the coarsening of austenite grains in quenching and heating. In order to obtain such effects, the Al content needs to be 0.01% or more. On the other hand, when a large amount of Al is contained so that the content exceeds 0.10%, the amount of oxide-based inclusions increases, which shortens the fatigue life. Therefore, Al was limited to the range of 0.01% or more and 0.10% or less. Al is preferably 0.05% or less.

Cr: 0.01% or more and 0.50% or less

Cr is an element improving the hardenability of steel and contributing to an improvement of corrosion resistance. In order to obtain such effects, the content needs to be 0.01% or more. On the other hand, when the Cr content exceeds 0.50%, the electric resistance weldability decreases. Therefore, Cr was limited to the range of 0.01% or more and 0.50% or less. Cr is preferably 0.1% or more. Cr is preferably 0.3% or less.

Ti: 0.01% or more and 0.05% or less

Ti is bonded to N to exhibit an effect of securing the amount of solid solution B effective for an improvement of hardenability. Moreover, Ti is precipitated as fine carbide to contribute to refining of austenite grains in heat treatment, such as quenching, and contribute to an improvement of the fatigue resistance in a corrosion environment (corrosion fatigue resistance). In order to obtain such effects, the Ti content needs to be 0.01% or more. On the other hand, when the content exceeds Ti: 0.05%, a coarse titanium sulfide (TiS) is likely to be formed and the coarse titanium sulfide is likely to serve as the starting point of a corrosion pit, so that the corrosion resistance and the corrosion fatigue resistance decrease. Therefore, Ti was limited to the range of 0.01% or more and 0.05% or less. Ti is preferably 0.04% or less.

B: 0.0005% or more and 0.0050% or less

B is an effective element improving the hardenability of steel at a trace amount. B has an action of strengthening the grain boundary and suppresses the grain boundary embrittlement due to the segregation of P. In order to obtain such effects, the B content needs to be 0.0005% or more. On the other hand, even when the B content exceeds 0.0050%, the effects are saturated, which is economically disadvantageous. Therefore, B was limited to the range of 0.0005% or more and 0.005% or less. B is preferably 0.0010% or more. B is preferably 0.0030% or less.

Ca: 0.0001% or more and 0.0050% or less

Ca is an element having an action of controlling the form of sulfide-based inclusions into fine inclusions of a substantially spherical shape. Since coarse MnS particles have a risk of serving as the starting point of a fatigue fracture, Ca is added in order to suppress the generation of MnS. In order to obtain such effects, the Ca content needs to be 0.0001% or more. On the other hand, when a large amount Ca is contained so that the content exceeds 0.0050%, the amount of coarse CaS-based clusters excessively increases and the coarse CaS-based clusters conversely serve as the starting point of a fatigue crack, so that the fatigue characteristics decrease. Therefore, Ca was limited to the range of 0.0001% or more and 0.0050% or less. Ca is preferably 0.0010% or more. Ca is preferably 0.0030% or less.

N: 0.0050% or less

N is inevitably contained as an impurity. N is bonded to nitride forming elements in steel to contribute to the suppression of the coarsening of crystal grains and further an increase in the strength after tempering. However, the N content exceeding 0.0050% reduces the toughness of a weld zone. Therefore, N was limited to 0.0050% or less. N is preferably 0.0010% or less. N is more preferably 0.0003% or less. Since N is inevitably contained, the content usually reaches 0.0001% or more.

One or two kinds selected from Cu: 0.05% or more and 1.00% or less and Ni: 0.05% or more and 1.00% or less Both Cu and Ni are elements improving the hardenability and improving the corrosion resistance and can be selected and contained as necessary. In order to obtain such effects, the contents of Cu: 0.05% or more and Ni: 0.05% or more are needed. On the other hand, both Cu and Ni are expensive elements, and thus, when the contents exceed Cu: 1.00% and Ni: 1.00%, a material cost increase is caused. Therefore, when Cu, Ni are contained, it is preferable to limit the contents to Cu: 1.00% or less and Ni: 1.00% or less. The contents are preferably limited to Cu: 0.05% or more and Ni: 0.05% or more. Cu: 0.10% or more and Ni: 0.10% or more are more preferable. Cu: 0.50% or less and Ni: 0.50% or less are more preferable.

One or two or more kinds selected from Nb: 0.001% or more and 0.050% or less, W: 0.001% or more and 0.050% or less, and V: 0.05% or more and 0.50% or less Nb, W, and V are all elements forming fine carbides to contribute to an increase in the strength (hardness). One or two or more kinds thereof can be selected and contained as necessary. In order to obtain such an effect, the contents of Nb: 0.001% or more, W: 0.01% or more, and V: 0.05% or more are needed. On the other hand, even when the contents exceed Nb: 0.050%, W: 0.050%, and V: 0.50%, the effects are saturated, and thus the effects matching the contents cannot be expected, which is economically disadvantageous. The carbides are likely to be coarsened to adversely affect the toughness. Therefore, when Nb, W, and V are contained, it is preferable to limit the contents to Nb: 0.050% or less, W: 0.050% or less, and V: 0.50% or less. Nb: 0.010% or more, W: 0.010% or more, and V: 0.10% or more are more preferable. Nb: 0.030% or less, W: 0.030% or less, and V: 0.30% or less are more preferable.

REM: 0.001% or more and 0.020% or less

REM is an element having an action of controlling the form of sulfide-based inclusions into fine inclusions having a substantially spherical shape as with Ca. In this embodiment, it is preferable to contain 0.001% or more of REM from the viewpoint of complementing the action of Ca. On the other hand, when the REM content exceeds 0.020%, the amount of the inclusions excessively increases and the inclusions conversely serve as the starting point of a fatigue crack, so that the fatigue characteristics decrease. Therefore, when REM is contained, REM is preferably limited to 0.020% or less. REM is more preferably 0.001% or more. REM is more preferably 0.010% or less.

<Effects of Electric Resistance Welded Steel Pipe 5 for Producing Hollow Stabilizer>

In the electric resistance welded steel pipe 5 for producing a hollow stabilizer, the internal weld bead cut portion 30 is formed so that the depth H of the trough portion 30a is 0.3 mm or less and the angle θ formed by the central portion in the circumferential direction of the trough portion 30a and the top of the right and left peak portions 30b, 30c located on both the right and left sides of the trough portion 30a is 160° or more and less than 180°.

Even when a hollow stabilizer with reduced local stress concentration in the weld bead zone of the pipe inner surface, high strength, and a reduced thickness is produced by applying this configuration, high fatigue characteristics can be obtained (see Example described later).

More specifically, the electric resistance welded steel pipe 5 for producing a hollow stabilizer of this embodiment is the electric resistance welded steel pipe 5 which is a steel pipe for producing a hollow stabilizer and has, on the pipe inner surface, the internal weld bead cut portion 30 having the outline shape of the three-peak shape along the circumferential direction in which the trough portion 30a with a reduced thickness is formed on each of both the right and left sides across the weld zone, in which the internal weld bead cut portion 30 has the depth H of the trough portion 30a of 0.3 mm or less and the angle θ formed by the central portion in the circumferential direction of the trough portion 30a and the top of the right and left peak portions 30b, 30c located on both the right and left sides of the trough portion 30a of 160° or more and less than 180°.

It is found that this configuration can improve the fatigue characteristics of a hollow stabilizer produced using the electric resistance welded steel pipe 5 for producing a hollow stabilizer.

At this time, steel materials configuring the steel pipe may contain, in terms of % by mass, C: 0.20% or more and 0.40% or less, Si: 0.1% or more and 1.0% or less, Mn: 0.1% or more and 2.0% or less, P: 0.100% or less, S: 0.010% or less, Al: 0.01% or more and 0.10% or less, Cr: 0.01% or more and 0.50% or less, Ti: 0.01% or more and 0.05% or less, B: 0.0005% or more and 0.0050% or less, Ca: 0.0001% or more and 0.0050% or less, N: 0.0050% or less, and the balance of Fe and inevitable impurities.

By adopting this configuration, the hardness of the produced hollow stabilizer can be certainly set to 400 HV or more and less than 580 HV, and thus a high strength hollow stabilizer excellent in fatigue characteristics can be provided.

<Hollow Stabilizer>

Figure 5:
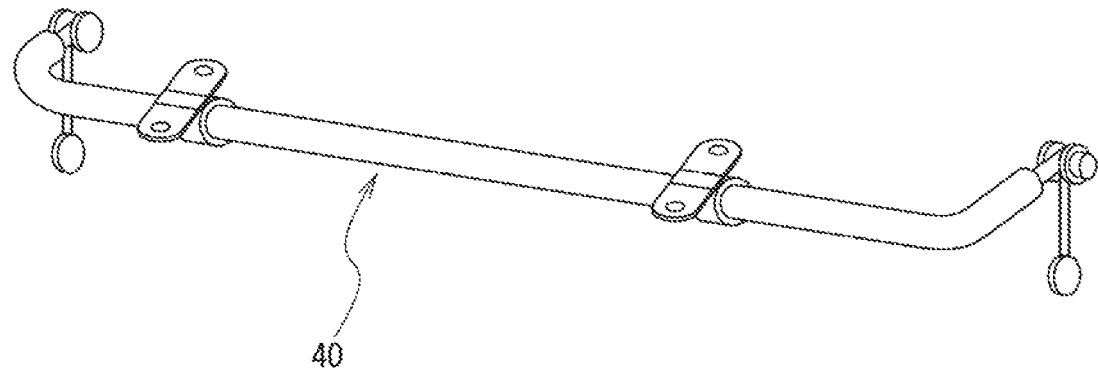
FIG. 5 is a figure illustrating an example of the shape of a hollow stabilizer.

A hollow stabilizer 40 of this embodiment is a hollow stabilizer which is obtained by working the electric resistance welded steel pipe 5 for producing a hollow stabilizer into a shape illustrated in FIG. 5 so that the Vickers hardness is 400 HV or more and less than 580 HV.

The hollow stabilizer has, for example, a molding step of applying cold bending to the electric resistance welded steel pipe 5 for producing a hollow stabilizer described above and a heat treatment step of applying heat treatment including quenching treatment or quenching and tempering treatment thereto after the molding step and is produced so that the hardness after the heat treatment is adjusted to 400 HV or more and less than 580 HV in terms of the Vickers hardness by the heat treatment of the heat treatment step. Furthermore, shot blasting treatment may be applied to the pipe inner surface, the pipe outer surface, or the pipe inner and outer surfaces.

The molding step molds the electric resistance welded steel pipe 5 into a target stabilizer shape. As molding methods, all known molding methods are applicable. The treatment in the molding step is preferably cold bending from the viewpoint of suppressing the surface decarburization. In the cold bending, rotary draw bending, press bending, and the like can be illustrated.

The heat treatment step includes quenching treatment or quenching and tempering treatment.

The quenching treatment is preferably treatment including heating the electric resistance welded steel pipe 5 to a temperature equal to or higher than the $Ac_3$ transformation point, preferably a temperature of 1100° C. or less, holding the steel pipe at the temperature for a predetermined time, preferably 1 second or more, placing the electric resistance welded steel pipe 5 in a quenching vessel, and then rapidly cooling the electric resistance welded steel pipe 5 at a cooling rate of 10° C./s or more and 100° C./s or less, for example. Thus, the hollow stabilizer 40 of this embodiment can possess high strength and high toughness.

When the quenching heating temperature exceeds 1100° C. to be a high temperature, austenite grains are coarsened. The heating is preferably electrical heating from the viewpoint of the suppression of surface decarburization and the productivity. A refrigerant of a quenching vessel is preferably water, quenching oil, or a concentration-adjusted mixed liquid of water and a polymer.

It is preferable that, after the quenching treatment, tempering treatment is further applied. In the tempering treatment, the tempering temperature is preferably adjusted in accordance with desired hardness. The tempering temperature is suitably 200° C. or more and 450° C. or less. By applying the tempering treatment, the toughness is markedly improved.

It is needless to say that the application of common shot blasting treatment to the pipe inner surface, the pipe outer surface, or the pipe inner and outer surfaces after the heat treatment is preferable for an improvement of the fatigue resistance.

The hollow stabilizer of this embodiment contains the component composition described above, in which the depth H of the thin portion (trough portion 30*a*) of the three-peak shape of the internal weld bead cut portion 30 is 0.3 mm or less and the angle θ formed by the thin portion (trough portion 30*a*) and the central thick portions (peak portions 30*b*, 30*c*) of the three-peak shape is 160° or more and less than 180°.

The hardness after the heat treatment is set to high strength of 400 HV or more and less than 580 HV in terms of the Vickers hardness.

Herein, in this embodiment, the "high strength" refers to a case where the average hardness in the thickness direction is 400 HV or more and preferably 450 HV or more in terms of the Vickers hardness. When the average hardness in the thickness direction reaches 580 HV or more, a reduction in the toughness becomes remarkable, and therefore less than 580 HV is set as the upper limit.

The "excellent in fatigue characteristics" as used herein refers to a case where a fatigue test (alternating) with a load stress: ±400 MPa is performed, so that the number of repetitions before the occurrence of a crack is 200,000 times or more.

EXAMPLE

Next, Example based on this embodiment is described.

The compositions of hot-rolled steel sheets to be used in Example are illustrated in Table 1.

TABLE 1

| Steel No. | C | Si | Mn | P | S | Al | Ti | Cr | B | N | Ca | Cu, Ni | Nb, V, W | REM |
|---|---|---|---|---|---|---|---|---|---|---|---|---|---|---|
| A | 0.40 | 0.15 | 1.25 | 0.013 | 0.001 | 0.035 | 0.035 | 0.15 | 0.0025 | 0.0021 | 0.0015 | — | — | — |
| B | 0.36 | 0.12 | 1.24 | 0.015 | 0.001 | 0.032 | 0.034 | 0.15 | 0.0022 | 0.0025 | 0.0011 | — | — | — |
| C | 0.26 | 0.11 | 1.25 | 0.016 | 0.001 | 0.035 | 0.036 | 0.15 | 0.0018 | 0.0018 | 0.0013 | — | — | — |
| D | 0.22 | 0.15 | 0.55 | 0.012 | 0.001 | 0.036 | 0.015 | 0.25 | 0.0015 | 0.0022 | 0.0015 | — | — | — |
| E | 0.35 | 0.15 | 1.35 | 0.015 | 0.001 | 0.035 | 0.035 | 0.11 | 0.0012 | 0.0025 | 0.0015 | Cu 0.15, Ni 0.12 | — | — |
| F | 0.35 | 0.15 | 1.35 | 0.015 | 0.001 | 0.035 | 0.035 | 0.11 | 0.0012 | 0.0025 | 0.0015 | — | Nb 0.015 | — |
| G | 0.26 | 0.15 | 1.35 | 0.015 | 0.001 | 0.035 | 0.015 | 0.11 | 0.0012 | 0.0025 | 0.0015 | — | V 0.05 | — |
| H | 0.35 | 0.15 | 1.35 | 0.015 | 0.001 | 0.035 | 0.035 | 0.11 | 0.0012 | 0.0025 | 0.0015 | — | W 0.05 | — |
| I | 0.35 | 0.15 | 1.35 | 0.015 | 0.001 | 0.035 | 0.025 | 0.11 | 0.0012 | 0.0025 | 0.0015 | — | — | 0.001 |
| J | 0.45 | 0.12 | 1.24 | 0.015 | 0.001 | 0.032 | 0.034 | 0.15 | 0.0022 | 0.0025 | 0.0011 | — | — | — |
| K | 0.16 | 0.12 | 1.24 | 0.015 | 0.001 | 0.032 | 0.034 | 0.15 | 0.0022 | 0.0025 | 0.0011 | — | — | — |

TABLE 1-continued

| Steel No. | C | Si | Mn | P | S | Al | Ti | Cr | B | N | Ca | Cu, Ni | Nb, V, W | REM |
|---|---|---|---|---|---|---|---|---|---|---|---|---|---|---|
| L | 0.35 | 0.12 | 1.24 | 0.015 | 0.001 | 0.032 | 0.034 | 0.15 | — | 0.0025 | 0.0011 | — | — | — |
| M | 0.35 | 0.12 | 1.24 | 0.015 | 0.001 | 0.032 | 0.034 | — | 0.0015 | 0.0025 | 0.0011 | — | — | — |
| N | 0.35 | 0.12 | 1.24 | 0.015 | 0.001 | 0.032 | 0.005 | 0.12 | 0.0015 | 0.0025 | 0.0011 | — | — | — |
| O | 0.36 | 0.12 | 1.24 | 0.015 | 0.001 | 0.032 | 0.034 | 0.15 | 0.0022 | 0.0025 | — | — | — | — |
| P | 0.36 | 0.12 | 1.24 | 0.015 | 0.012 | 0.032 | 0.034 | 0.15 | 0.0022 | 0.0025 | 0.0015 | — | — | — |

In Example, a hot-rolled steel sheet (sheet thickness: 4.3 mm) was continuously molded using a plurality of rolls by cold rolling to be made into an open pipe having a substantially cylindrical shape. Next, end portions in the circumferential direction of the open pipe were butted and pressed into contact with each other, and then subjected to electric resistance welding using a high frequency electric resistance welding method to form the electric resistance welded pipe 2 (Outer diameter of 89.1 mmϕ×Thickness of 4.3 mm).

Furthermore, the obtained electric resistance welded pipe 2 was heated to a heating temperature (heating temperature before stretch reducing) illustrated in Table 2, and then subjected to a stretch reducing step of performing stretch reducing at a cumulative reduction ratio illustrated in Table 2 with a stretch reducer to be made into the electric resistance welded steel pipe 5 of the dimension (Outer diameter of 25.4 mmϕ×Thickness of 4.0 mm) illustrated in Table 2. The electric resistance welded steel pipe 5 was used as a raw material for producing a hollow stabilizer.

Then, in Example, 23 electric resistance welded steel pipes 5 for producing a hollow stabilizer of Pipe Nos. 1 to 23 were produced as illustrated in Table 2.

From an electric resistance weld zone of each electric resistance welded steel pipe 5 for producing a hollow stabilizer, a structure observation test piece (cross section in which the observation surface is perpendicular to the pipe axis direction) was collected, and then the depth H of the thin portion (trough portion 30a) of the three-peak shape of the internal weld bead cut portion 30 of the pipe and the angle θ formed by the thin portion (trough portion 30a) and the central thick portions (peak portions 30b, 30c) of the three-peak shape were measured using an optical microscope (magnification: 10 to 20 times).

The electric resistance welded steel pipes 5 for producing a hollow stabilizer were subjected to bending into an L shape by rotary draw bending (with bending radius twice the pipe outer diameter), so that samples imitating a hollow stabilizer were produced. At this time, heat treatment including quenching and tempering was applied under the conditions illustrated in Table 2.

The quenching treatment was treatment including performing electrical heating such that the outer surface of the steel pipe had the heating temperature illustrated in Table 2, and then immersing the steel pipe in a water tank. After the quenching treatment, tempering treatment of holding the steel pipe at the temperature illustrated in Table 2 for 20 min was applied. Thereafter, shot blasting was applied to the outer surface with a steel ball, so that L-shaped test pieces of Pipe Nos. 1 to 23 were produced to be used as samples for a torsional fatigue test.

A hardness measurement piece was collected from each sample before the application of the shot blasting, and then hardness measurement was performed. The hardness measurement was performed for the cross section (C cross section) perpendicular to the pipe axis direction of the steel pipe and was performed at 0.3 mm pitches from the pipe outer surface to the pipe inner surface in the thickness direction using a Vickers hardness meter (load: 500 gf (4.9 N)).

In the torsional fatigue test, a fatigue test (alternating) with a load stress: ±400 MPa at a place where the generated stress was the highest (position at about 60° in the pipe circumferential direction from the inner side of the bending) was performed to investigate the number of repetitions before the occurrence of a crack. As the test conditions, the load stress was set to ±400 MPa (alternating) and the frequency was set to 1 Hz.

The obtained results are illustrated in Table 2.

TABLE 2

| | | Before reducing | | After reducing | | Cumulative | Thickness | Heating temperature before | Rolling | Internal weld bead shape | |
|---|---|---|---|---|---|---|---|---|---|---|---|
| Pipe No. | Steel No. | Outer diameter (mm) | Thickness (mm) | Outer diameter (mm) | Thickness (mm) | reduction ratio (%) | reduction ratio (%) | stretch reducing (° C.) | finishing temperature (° C.) | Depth H (mm) | Formed angle (° C.) |
| 1 | A | 89.1 | 4.3 | 25.4 | 4 | 71.5 | 7 | 980 | 830 | 0.08 | 172 |
| 2 | B | 89.1 | 4.3 | 25.4 | 4 | 71.5 | 7 | 960 | 820 | 0.06 | 175 |
| 3 | C | 89.1 | 4.3 | 25.4 | 4 | 71.5 | 7 | 1000 | 800 | 0.05 | 175 |
| 4 | D | 89.1 | 4.3 | 25.4 | 4 | 71.5 | 7 | 960 | 780 | 0.08 | 174 |
| 5 | E | 89.1 | 4.3 | 25.4 | 4 | 71.5 | 7 | 980 | 800 | 0.09 | 170 |
| 6 | F | 89.1 | 4.3 | 25.4 | 4 | 71.5 | 7 | 970 | 820 | 0.1 | 174 |
| 7 | G | 89.1 | 4.3 | 25.4 | 4 | 71.5 | 7 | 960 | 760 | 0.08 | 171 |
| 8 | H | 89.1 | 4.3 | 25.4 | 4 | 71.5 | 7 | 960 | 800 | 0.07 | 170 |
| 9 | I | 89.1 | 4.3 | 25.4 | 4 | 71.5 | 7 | 920 | 780 | 0.06 | 175 |
| 10 | J | 89.1 | 4.3 | 25.4 | 4 | 71.5 | 7 | 950 | 800 | 0.08 | 176 |
| 11 | K | 89.1 | 4.3 | 25.4 | 4 | 71.5 | 7 | 980 | 790 | 0.09 | 177 |
| 12 | L | 89.1 | 4.3 | 25.4 | 4 | 71.5 | 7 | 980 | 790 | 0.08 | 172 |
| 13 | M | 89.1 | 4.3 | 25.4 | 4 | 71.5 | 7 | 980 | 850 | 0.09 | 171 |
| 14 | N | 89.1 | 4.3 | 25.4 | 4 | 71.5 | 7 | 980 | 750 | 0.35 | 140 |
| 15 | O | 89.1 | 4.3 | 25.4 | 4 | 71.5 | 7 | 980 | 750 | 0.06 | 170 |
| 16 | P | 89.1 | 4.3 | 25.4 | 4 | 71.5 | 7 | 980 | 750 | 0.08 | 172 |

TABLE 2-continued

| | | | | | | | | | | | |
|---|---|---|---|---|---|---|---|---|---|---|---|
| 17 | B | 89.1 | 3.9 | 25.4 | 4 | 71.4927 | −2.6 | 970 | 750 | 0.32 | 150 |
| 18 | B | 89.1 | 4.3 | 17.3 | 4 | 80.6 | 7 | 960 | 750 | 0.4 | 142 |
| 19 | B | 89.1 | 4.3 | 25.4 | 4 | 71.5 | 7 | 1080 | 860 | 0.08 | 171 |
| 20 | B | 89.1 | 4.3 | 25.4 | 4 | 71.5 | 7 | 980 | 830 | 0.08 | 172 |
| 21 | B | 89.1 | 4.3 | 25.4 | 4 | 71.5 | 7 | 980 | 830 | 0.06 | 171 |
| 22 | B | 89.1 | 4.3 | 25.4 | 4 | 71.5 | 7 | 980 | 830 | 0.07 | 170 |
| 23 | B | 89.1 | 4.3 | 25.4 | 4 | 71.5 | 7 | 860 | 600 | 0.09 | 172 |

| Pipe No. | Bending | Heat treatment Quenching electrical-heating temperature (°C.) | Tempering temperature (°C.) | HV hardness after heat treatment | Outer surface shot blasting | Remarks | Fatigue test Durable life (σ = 400 MPa) |
|---|---|---|---|---|---|---|---|
| 1 | Cold bending | 900 | 280 | 570 | Done | | 350000 times |
| 2 | Cold bending | 900 | 260 | 550 | Done | | 310000 times |
| 3 | Cold bending | 900 | 250 | 470 | Done | | 280000 times |
| 4 | Cold bending | 900 | 300 | 440 | Done | | 250000 times |
| 5 | Cold bending | 900 | 260 | 500 | Done | | 300000 times |
| 6 | Cold bending | 900 | 260 | 530 | Done | | 310000 times |
| 7 | Cold bending | 900 | 260 | 500 | Done | | 300000 times |
| 8 | Cold bending | 900 | 260 | 500 | Done | | 290000 times |
| 9 | Cold bending | 900 | 260 | 500 | Done | | 320000 times |
| 10 | Cold bending | 900 | 230 | 590 | Done | Quenching crack occurred | 50000 times |
| 11 | Cold bending | 900 | 280 | 380 | Done | | 100000 times |
| 12 | Cold bending | 900 | 260 | 380 | Done | | 100000 times |
| 13 | Cold bending | 900 | 260 | 390 | Done | | 110000 times |
| 14 | Cold bending | 900 | 260 | 280 | Done | | 70000 times |
| 15 | Cold bending | 900 | 260 | 490 | Done | Crack starting from inclusion | 150000 times |
| 16 | Cold bending | 900 | 260 | 500 | Done | Crack starting from inclusion | 110000 times |
| 17 | Cold bending | 900 | 260 | 500 | Done | | 150000 times |
| 18 | Cold bending | 900 | 260 | 500 | Done | | 140000 times |
| 19 | Cold bending | 900 | 260 | 500 | Done | High surface decarburization → Surface HV hardness 250 | 120000 times |
| 20 | Cold bending | 1110 | 260 | 500 | Done | High surface decarburization →Surface HV hardness 230 | 110000 times |
| 21 | Cold bending | 900 | 480 | 330 | Done | | 80000 times |
| 22 | Cold bending | 900 | 180 | 500 | Done | Brittle fracture | 80000 times |
| 23 | Cold bending | 900 | 260 | 500 | Done | Crack in cold work | Untestable |

As is understood from Table 2, in Pipe Nos. 1 to 9 based on aspects of the present invention, the hardness after the quenching and tempering treatment can be set to 400 HV or more and the strength is high (high hardness). Furthermore, the number of repetitions of loading before a fracture by the fatigue test is 200,000 times or more. Thus, it is found that a high strength hollow stabilizer excellent in fatigue characteristics can be produced.

Meanwhile, a comparison between Pipe No. 2 and Pipe Nos. 17 and 18 shows that, even when the hardness after the heat treatment is set so that the strength is as high as 500 HV or more in all the pipes with use of the same steel material, Pipe Nos. 17 and 18 in which the shape of the internal bead cut portion does not satisfy the range according to aspects of the present invention have the number of repetitions of loading before a fracture by the fatigue test of less than 200,000 times. Thus, it is found that, by forming the shape of the internal bead cut portion to satisfy the range according to aspects of the present invention, a hollow stabilizer excellent in fatigue characteristics can be produced when the strength is set to the same high strength.

Herein, in Pipe No. 10, the strength was set to 590 HV, and therefore the toughness decreased, so that a crack occurred. More specifically, in Pipe No. 10, due to an attempt to forcibly increase the hardness of the end product to 590 HV, a strain due to a quenching crack was formed in the product, so that the life was shortened.

In Pipe Nos. 15, 16, due to the fact that an excessive amount of S as the material was compounded or Ca was not compounded, a crack starting from an inclusion occurred.

Pipe Nos. 11 to 14 have hardness of less than 400 HV and do not achieve high strength, and therefore the number of repetitions of loading before a fracture by the fatigue test is less than 200,000 times. However, by forming the shape of the internal bead cut portion to satisfy the range according to aspects of the present invention, the fatigue characteristics are improved as compared with a case where the shape of the internal bead cut portion is not formed to satisfy the range according to aspects of the present invention.

As described above, by forming the shape of the three-peak shape of the internal bead cut portion of the electric resistance welded steel pipe 5 for producing a hollow stabilizer in which the shape of the internal bead cut portion is the three-peak shape by the application of the hot stretch reducing to satisfy the range according to aspects of the present invention, the fatigue characteristics of the electric resistance welded steel pipe 5 for producing a hollow stabilizer can be improved.

Furthermore, it is found that, when a hollow stabilizer having hardness of 400 HV or more and less than 580 HV is produced using the electric resistance welded steel pipe 5 for producing a hollow stabilizer, a high strength hollow stabilizer excellent in fatigue characteristics can be produced.

As described above, the entire contents of Japanese Patent Application No. 2018-065875 (filed Mar. 29, 2018) to which this application claims priority form part of this disclosure by reference. Although the description is given referring to a limited number of embodiments herein, the scope of the present invention is not limited thereto. It is obvious for those skilled in the art to alter and modify the embodiments based on the disclosure above.

REFERENCE SIGNS LIST 1 first step
1A open pipe molding unit
1B electric resistance welding treatment unit
1C bead cutting treatment unit
2 electric resistance welded pipe
3 second step
3A heat treatment unit
3B hot stretch reducing treatment unit
4 third step
5 electric resistance welded steel pipe
12 weld line
30 internal weld bead cut portion
30$a$ trough portion
30$b$, 30$c$ peak portion
40 hollow stabilizer
H depth
θ angle

The invention claimed is:

1. An electric resistance welded steel pipe for producing a hollow stabilizer,
the electric resistance welded steel pipe being a steel pipe for producing a hollow stabilizer and comprising:
on a pipe inner surface, an internal weld bead cut portion having an outline shape of a three-peak shape along a circumferential direction in which a trough portion is formed on each of both right and left sides across a weld zone, wherein
in the internal weld bead cut portion, a depth H of the trough portion is 0.3 mm or less and an angle θ formed by a central portion in the circumferential direction of the trough portion and a top of right and left peak portions located on both right and left sides of the trough portion is 160° or more and less than 180°.

2. The electric resistance welded steel pipe for producing a hollow stabilizer according to claim 1, wherein
a steel material configuring the steel pipe contains, in terms of % by mass, C: 0.20% or more and 0.40% or less, Si: 0.1% or more and 1.0% or less, Mn: 0.1% or more and 2.0% or less, P: 0.100% or less, S: 0.010% or less, Al: 0.01% or more and 0.10% or less, Cr: 0.01% or more and 0.50% or less, Ti: 0.01% or more and 0.05% or less, B: 0.0005% or more and 0.0050% or less, Ca: 0.0001% or more and 0.0050% or less, N: 0.0050% or less, and a balance of Fe and an inevitable impurity.

3. The electric resistance welded steel pipe for producing a hollow stabilizer according to claim 2, wherein
the steel material configuring the steel pipe further contains, in terms of % by mass, either or both of Cu: 0.05% or more and 1.00% or less and Ni: 0.05% or more and 1.00% or less.

4. The electric resistance welded steel pipe for producing a hollow stabilizer according to claim 2, wherein
the steel material configuring the steel pipe further contains, in terms of % by mass, one or two or more kinds selected from Nb: 0.001% or more and 0.050% or less, W: 0.001% or more and 0.050% or less, and V: 0.05% or more and 0.50% or less.

5. The electric resistance welded steel pipe for producing a hollow stabilizer according to claim 2, wherein
the steel material configuring the steel pipe further contains, in terms of % by mass, REM: 0.001% or more and 0.020% or less.

6. The electric resistance welded steel pipe for producing a hollow stabilizer according to claim 3, wherein
the steel material configuring the steel pipe further contains, in terms of % by mass, one or two or more kinds selected from Nb: 0.001% or more and 0.050% or less, W: 0.001% or more and 0.050% or less, and V: 0.05% or more and 0.50% or less.

7. The electric resistance welded steel pipe for producing a hollow stabilizer according to claim 2, wherein
the steel material configuring the steel pipe further contains, in terms of % by mass, REM: 0.001% or more and 0.020% or less.

8. The electric resistance welded steel pipe for producing a hollow stabilizer according to claim 3, wherein
the steel material configuring the steel pipe further contains, in terms of % by mass, REM: 0.001% or more and 0.020% or less.

9. The electric resistance welded steel pipe for producing a hollow stabilizer according to claim 4, wherein
the steel material configuring the steel pipe further contains, in terms of % by mass, REM: 0.001% or more and 0.020% or less.

10. A production method for an electric resistance welded steel pipe for producing a hollow stabilizer comprising:
a first step of molding a steel sheet into a cylindrical shape by cold molding to form an open pipe, butting end portions in a width direction of the open pipe against each other, and performing electric resistance welding to the end portions to form an electric resistance welded pipe;

a second step of heating the electric resistance welded pipe to a temperature of 850° C. or more and 1000° C. or less, and then applying hot stretch reducing to the electric resistance welded pipe at a rolling temperature of 650° C. or more and 1000° C. or less and at a cumulative reduction ratio of 30% or more and 90% or less; and a third step of adjusting an internal weld bead cut portion having an outline shape of a three-peak shape along a circumferential direction in which a trough portion is formed on each of both right and left sides across a weld zone such that a depth H of the trough portion is 0.3 mm or less and an angle θ formed by a central portion in the circumferential direction of the trough portion and a top of right and left peak portions located on both right and left sides of the trough portion is 160° or more and less than 180°.

11. The production method for an electric resistance welded steel pipe for producing a hollow stabilizer according to claim 10, wherein the steel sheet contains, in terms of % by mass, C: 0.20% or more and 0.40% or less, Si: 0.1% or more and 1.0% or less, Mn: 0.1% or more and 2.0% or less, P: 0.100% or less, S: 0.010% or less, Al: 0.01% or more and 0.10% or less, Cr: 0.01% or more and 0.50% or less, Ti: 0.01% or more and 0.05% or less, B: 0.0005% or more and 0.0050% or less, Ca: 0.0001% or more and 0.0050% or less, N: 0.0050% or less, and a balance of Fe and an inevitable impurity.

12. The production method for an electric resistance welded steel pipe for producing a hollow stabilizer according to claim 11, wherein the steel sheet further contains, in terms of % by mass, one or two or more kinds selected from Cu: 0.05% or more and 1.00% or less, Ni: 0.05% or more and 1.00% or less, Nb: 0.001% or more and 0.050% or less, W: 0.001% or more and 0.050% or less, V: 0.05% or more and 0.50% or less, and REM: 0.001% or more and 0.020% or less.

* * * * *